United States Patent [19]
Schimmeyer et al.

[11] Patent Number: 5,696,861
[45] Date of Patent: Dec. 9, 1997

[54] METHOD AND APPARATUS FOR SIMULTANEOUSLY CONNECTING DATA/SIGNAL COMMUNICATION LINES AND POWER LINES TO A DATA/RF RECEIVER/TRANSMITTER

[76] Inventors: Werner K. Schimmeyer, 8937 Acorn Pl., Santa Rosa, Calif. 95409; Claude A. S. Hamrick, 19570 Montevina Rd., Los Gatos, Calif. 95030

[21] Appl. No.: 696,356

[22] Filed: Aug. 13, 1996

[51] Int. Cl.$^6$ ............................................. G02B 6/38
[52] U.S. Cl. .................................................. 385/75
[58] Field of Search ..................... 385/75, 76, 77, 385/147, 100; 361/42, 107, 680; 379/96; 439/245, 535, 578, 651; 375/257

[56] References Cited

U.S. PATENT DOCUMENTS

| | | | |
|---|---|---|---|
| 3,866,093 | 2/1975 | Kusters et al. | 361/42 |
| 4,569,567 | 2/1986 | Zucchini | 439/639 |
| 4,941,048 | 7/1990 | Hartson et al. | 348/554 |
| 5,117,122 | 5/1992 | Hogarth et al. | 174/53 |
| 5,280,554 | 1/1994 | Glem et al. | 385/100 |

*Primary Examiner*—Akm E. Ullah
*Attorney, Agent, or Firm*—Claude A. S. Hamrick

[57] ABSTRACT

Television power, antenna and data coupling apparatus including the substitution of a coaxial cable or metal clad fiberoptics cable for the standard grounded wire of a typical power cord, with the ground prong being configured to form the male component of a coaxial jack connector. Similarly, at least one of the ground plug receptacles of a dual or other multiple socket wall connector is modified to form a female coaxial connector for receiving the male component of the jack connector. The outer conductor of the coaxial jack connector and the outer conductor of the female receptacle connector are used to provide the standard ground connection for the plug and receptacle. The inner metal and/or glass fiber conductors form the principal signal paths. Since the female component of the receptacle is of the same internal diameter as the standard ground pin receptacle, the plugging of a standard three-prong plug into the modified receptacle provides power to the plug in the identical manner of the non-video/data receptacle.

10 Claims, 3 Drawing Sheets

U.S. Patent     Dec. 9, 1997     Sheet 1 of 3     5,696,861
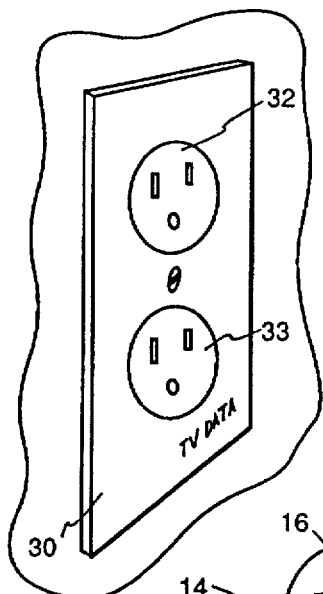
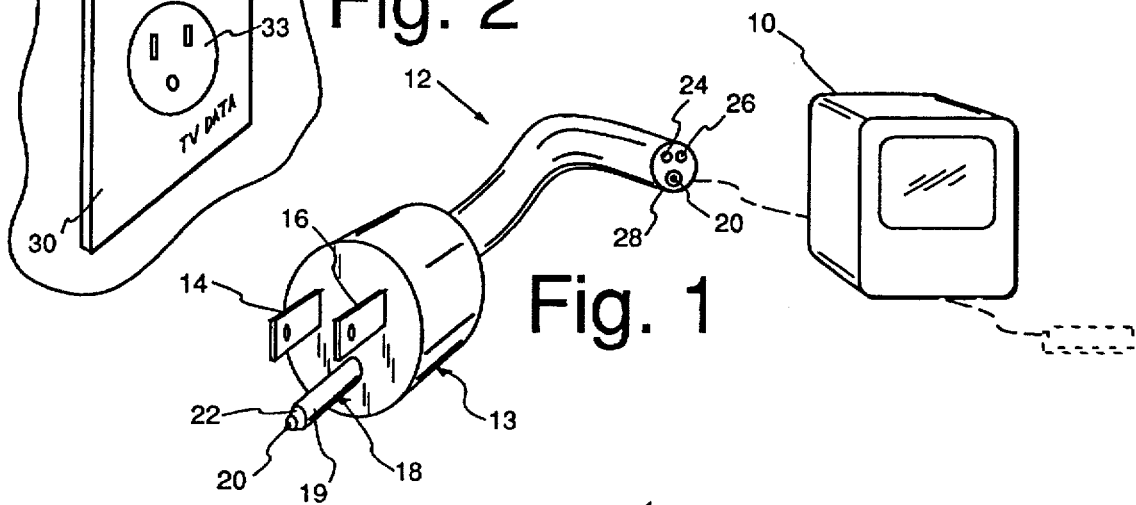
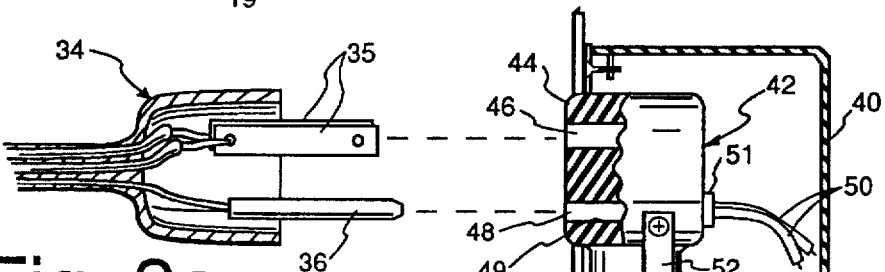
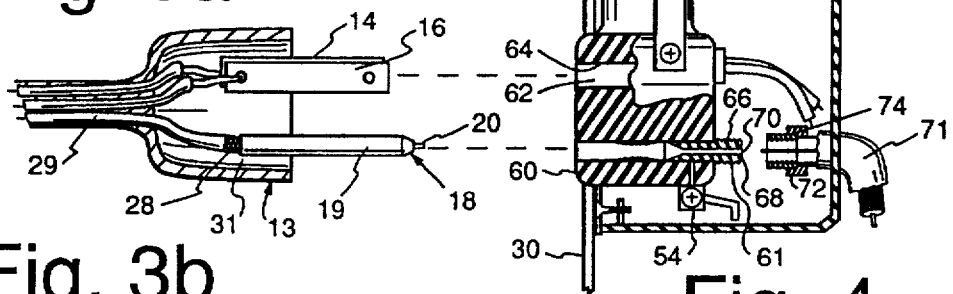

5,696,861

METHOD AND APPARATUS FOR SIMULTANEOUSLY CONNECTING DATA/SIGNAL COMMUNICATION LINES AND POWER LINES TO A DATA/RF RECEIVER/TRANSMITTER

BACKGROUND OF THE INVENTION

1. Field of the Invention

The present invention relates generally to means for coupling power and video/data signals to electronic apparatus, and more particularly to an improved power/signal input cord and wall receptacle designed to obviate the need to provide a separate power cord and signal cord to couple power and information signals to television sets, computers, and other electronic equipment receiving and/or transmitting digital and/or analog data over a coaxial cable or fiberoptics cable.

2. Description of the Prior Art

Television, video recorders, and FM receivers typically utilize separate cables for providing power and video/FM signals to the receiver. Computers used to remotely communicate with other computers likewise use separate lines for power and signal communication. Aside from the unsightliness of the antenna/data and power cords, the necessity of having separate cords or wires/cables adds to the expense of not only the materials required to make connection from wall outlet to receiver, but, if pre-wired into the walls of a home, also requires the provision of a separate outlet or outlets to accommodate the antenna/data cable. Although building codes require that power outlets be placed at regular intervals around the walls of the various rooms of a house, there is normally no requirement regarding television antenna and data communications outlets, and if installed, they are usually arbitrarily placed at one or two locations within a room. In many cases the arbitrary placement is not consistent with the furnishing of the room, and an unsightly wire or cable must be run from the outlet to the television or other communications unit. A similar situation exists in the use of personal computers and multimedia terminals adapted to receive video signals or data via a cable connection or fiberoptics connection.

SUMMARY OF THE INVENTION

It is therefore a principal objective of the present invention to provide an improved receiver cord and accommodating wall receptacle which combines the power- and signal carrying conductors in a single conduit, and utilizes a conventional grounded three-prong plug wall plug connector.

Another objective of the present invention is to provide apparatus of the type described which can be easily accommodated in standard wall receptacle boxes and which allows each receptacle to be used alternatively as a standard power socket for electrical lighting for appliances or as a power and signal outlet for information receiving and/or transmitting equipment.

Briefly, a preferred embodiment of the present invention includes the substitution of a coaxial cable or metal clad fiberoptics cable for the standard grounded wire of a typical power cord, with the ground prong being configured to form the male component of a coaxial jack connector. Similarly, at least one of the ground plug receptacles of a dual or other multiple socket wall connector is modified to form a female coaxial connector for receiving the male component of the jack connector. The outer conductor of the coaxial cable and male and female connectors is used to provide the standard ground connection for the plug. The inner metal or glass fiber conductor forms the principal signal path. Since the female component is of the same internal diameter as the standard ground pin receptacle, the plugging of a standard three-prong plug into the video/data receptacle performs in the identical manner of the non-video/data receptacle.

An important advantage of the present invention is that it does away with the need for a second cable leading from wall to television receiver or other signal-handling unit.

Another advantage of the present invention is that it provides a wall receptacle which is, from an external point of view, identical in every respect to a standard wall receptacle but has the additional advantage that at least one of the receptacles may be used to obtain both power and video or data signals.

Still another advantage of the present invention in that it provides a means for simultaneously coupling cables and optical signals to a terminal through a single opto-cable conduit.

These and other objects and advantages of the present invention will no doubt become apparent to those skilled in the art after having read the following detailed description of a preferred embodiment which is illustrated in the several figures of the drawing.

IN THE DRAWING

FIG. 1 is a diagram pictorially illustrating an improved power/information conduit connector and cord for a television or data terminal in accordance with the present invention;

FIG. 2 is a perspective view illustrating that the only apparent difference between a wall receptacle in accordance with the present invention and a standard wall receptacle is a suitable label;

FIGS. 3a and 3b are partially broken diagrams pictorially illustrating a standard three-prong power plug and the modifications made to a standard plug design according to the present invention;

FIG. 4 is a partially broken pictorial view illustrating modifications made to a standard wall plug receptacle in accordance with the present invention;

DESCRIPTION OF THE PREFERRED EMBODIMENTS

Figure 5:
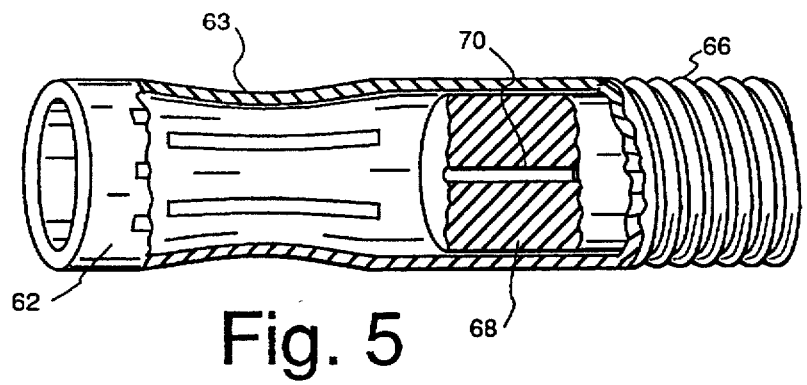
FIG. 5 is a partially broken pictorial view illustrating a cable end connector in accordance with the present invention.

Referring now to FIG. 1 of the drawing, a television set or data terminal unit is depicted at 10 having a power cord 12 and plug assembly 13 modified in accordance with the present invention. The power cord and plug are similar to a standard power cord and plug in that they include means for providing two power conductors and a ground conductor respectively terminating in power-receiving prongs 14 and 16, and a ground prong 18. However, in this embodiment the ground prong 18 is formed by the external conductor 19 of a coaxial jack pin including a center or inner conductor 20 separated from the outer conductor 19 by a coaxial insulating sleeve 22. Note that in order to protect the center conductor tip, the insulating sleeve 22 is extended beyond the end of the outer conductor 19, and may be tapered to facilitate plug connection. The power-conducting leads are shown at 24 and 26. The outer conductor of the coaxial cable, shown at 28, provides the usual ground conductor. Within the unit 10 the power leads are separated from the coaxial cable and appropriately connected to power and signal input terminals, respectively.

With the exception that the ground prong 18 includes a short length of center conductor 20 visible at its tip, the cord and plug assembly 12 appears to be substantially identical to the standard power cord. However, in order to accommodate the coaxial cable, the cord diameter might be of either larger-than-standard diameter or may even be configured in a somewhat oval, triangular or other suitable cross-sectional configuration.

In FIG. 2, face plate and plug receptacle faces 32 and 33 are illustrated evidencing that their appearance is substantially identical to those of a standard wall receptacle, except that a suitable labelling or other coding is provided to indicate that the lower receptacle 33 is configured to have a ground prong opening adapted to receive a coaxial jack pin of the type described above.

In FIG. 3a, standard three-prong power plug 34 is shown having a pair of power prongs 35 and a ground pin 36.

In FIG. 3b, a plug 13 of the novel type illustrated in FIG. 1 is shown including a pair of power prongs 14 and 16, and a coaxial jack pin 18 having an outer conductor 19 and an inner conductor 20. Note that the outer woven wire conductor 28 of coaxial cable 29 is solder-connected at 31 to the tubular outer sleeve-forming conductor 19.

In FIG. 4, which is juxtaposed to the right of FIGS. 3a and 3b, a standard wall box 40 is shown mounted in a standard wall configuration, but having installed therein a dual receptacle unit 42 modified in accordance with the present invention. The upper receptacle 44 is of standard configuration including a pair of power-prong-receiving openings or slots 46 and a third opening or passageway 48 for receiving the ground prong of the standard three-prong plug illustrated in FIG. 3a. As in standard power receptacle units, incoming power conductor leads 50 are either inserted in bayonet fashion into wire gripper connectors 51 formed in the back of the receptacle or are attached to screw fasteners 52 on opposite sides of the receptacle body. The ground-prong-receiving passageway 48 includes a contactor 49 connected by means (not shown) to a standard ground screw fastener 54 at the bottom of the receptacle.

The lower receptacle 60 of unit 42 is configured similar to that of the upper receptacle 44 except that the ground prong outer surface contacting connector 64 of the coaxial connector 61 disposed in passageway 62 is generally cylindrical and extends through the back wall of receptacle 60 to terminate in a threaded nipple 66. The connector 61 has an insulating sleeve 68 provided therein with a central bore 70 extending coaxially therethrough. Note that the outer contactor 64 is electrically connected to ground wire fastener 54 via a connector 71. In furtherance of the present invention, a standard coaxial cable connector 72 may be threadably connected to the nipple 66 with its center conductor 74 being telescopically received within the bore 70. With the coaxial cable 71 connected or not, a standard power plug such as that illustrated at 34 could be plugged into this receptacle 60. The receptacle's modified configuration will be transparent to the user in that the ground prong 36 will simply make contact with the connector 64 and be conductively associated with the ground terminal 54. However, if instead a power cord 13 in accordance with the present invention (including a pair of standard power prongs 14 and 16 and a coaxial prong 18 having a central axially extending conductor 20) were to be mated with the receptacle, both power and video or other data signals could be obtained via coaxial cable 71. It will thus be appreciated that a dual function receptacle has been provided which is fully compatible with standard power-supplying receptacles and plugs, yet offers the convenience of having both power and video/data signals available at the same wall connection, thereby eliminating the necessity for an extra antenna or data signal-carrying cable.

In FIG. 5, further details of one embodiment of the coaxial connector 62 are shown. As depicted, the connector is comprised of a generally cylindrical outer sleeve 64 which is slotted and deformed inwardly along a portion of its length to provide a plurality of flexible contactors, and is externally threaded along an end portion 66. Disposed within and extending along a portion of the length of connector 62 is the insulating sleeve 68, shown partially broken away to reveal the axial passageway 70. As will be understood by those skilled in the art, the deformed slotted segments 63 will provide means for frictionally and electrically engaging a jack pin (of the type illustrated in FIGS. 1 and 3b) as it is inserted axially thereinto.

Figures 6, 7:
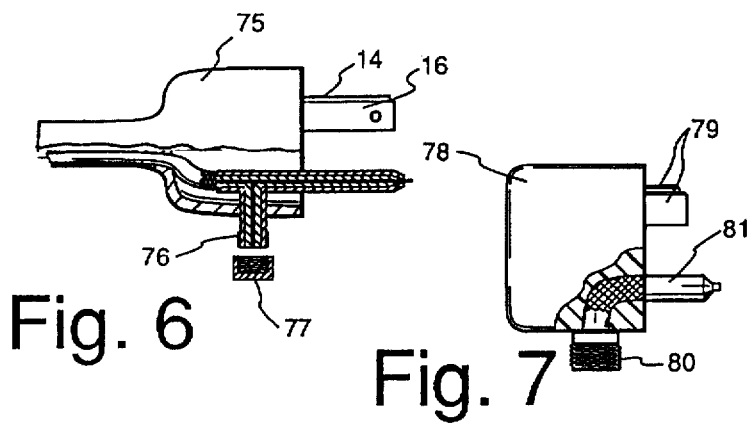
FIG. 6 is a partially broken away plug showing an alternative feature of the present invention.
FIG. 7 is a broken pictorial view illustrating a means for coupling a coaxial cable to the wall outlet without obtaining power therefrom.

In FIG. 6, an alternative plug 75 in accordance with the present invention is depicted having the additional feature of a splitter connection 76 provided at the side of the plug so that an additional video/RF receiver or data terminal can be attached to the same wall receptacle. For example, with a device having a plug configured as in FIG. 6, and plugged into the lower receptacle 60 (FIG. 4), a video recorder or playback device not configured in accordance with the present invention could use the upper plug for power and could connect its signal input cable to the splitter port 76. Although shown in simplified schematic form, it will be appreciated that the splitter may be specially configured to provide proper signal balance between signal paths. In order to protect the threaded port 76 during non-use, a suitable cap 77 may be provided.

It is recognized that, until the present invention becomes universally applied in television, multimedia terminals, etc., there will be a need to provide a means for coupling conventional video, data, and RF receiver apparatus to the receptacle. Accordingly, an adapter unit such as is illustrated in FIG. 7 at 78 is provided which includes a body of nonconductive plastic or other material having a pair of short prongs 79 of nonconductive material for insertion into the power-receiving slob of the receptacle as a stabilizing means, and a coaxial port 80 directly connected to a coaxial prong 81 for facilitating connection of the antenna cable, etc. to the coaxial component of the wall receptacle. In such case, the conventional power plug would be plugged into the upper receptacle and the coaxial data/antenna lead would be coupled to the adapter unit 78 and plugged into the lower receptacle 60 (FIG. 4).

Figure 8:
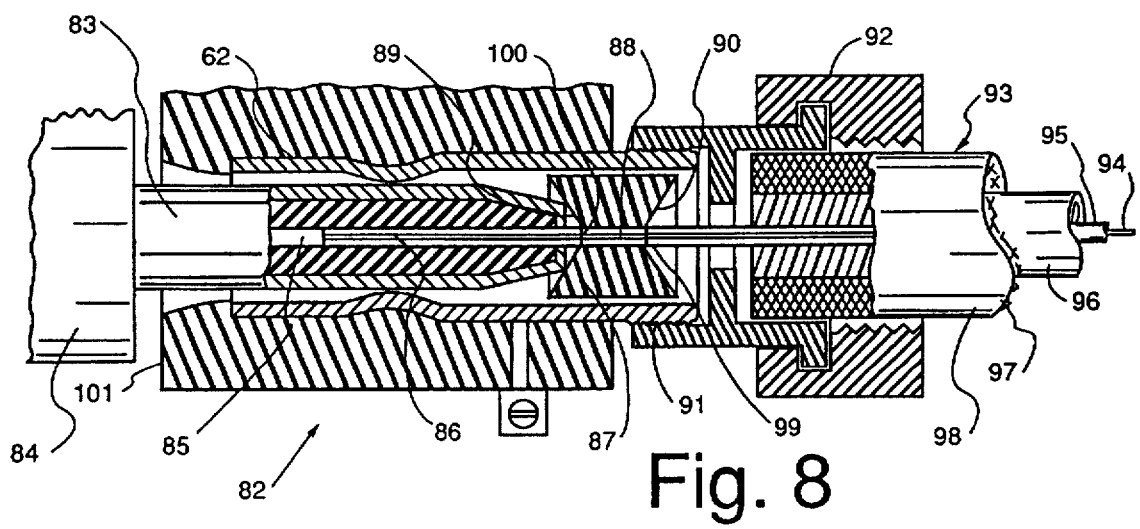
FIG. 8 is a cross-sectional view showing an opto-cable connector in accordance with the present invention.

Turning now to FIG. 8, an alternative embodiment of the present invention is depicted at 82 wherein, in addition to the coaxial electrical cable extending through the ground prong 83 of a plug partially shown at 84, the center conductor 85 is formed by a tubular conductor or by metal cladding an optical fiber or bundle of optical fibers 86. With such a means, both electrical signals and optical signals can be simultaneously transmitted and/or received at the outlet 82.

As in the previous embodiment, an outer conductor connector 62 is utilized, except instead of merely having a segment of centrally bored insulation (as at 68 in FIG. 5), this embodiment includes a slidable coupling element 87 of insulation having a short length 88 of metal clad optical fiber extending the full length of the element 87. Each end of the fiber 88 is optically flat polished. Each end surface of the insulation portion of element 87 is conically configured as indicated at 89 and 90. The element 87 may be friction-retained within the outer sleeve of connector 62 or may be spring-loaded toward one end or the other thereof.

At the internal end 91 of connector 83, a coaxial connector 92 is threadably engaged thereto to connect an opto-electric cable 93 comprised of an optical fiber 94 that is metal clad to form a central conductor 95 having an insulating sleeve 96 disposed thereabout. Wrapped about sleeve 96 is a woven wire outer coaxial conductor 97 that is covered by an outer layer of insulation 98. The end 99 of fiber 94 is flat end polished and its length is adjusted so as to have a predetermined extension within the connector 92.

In use, the cable 98 would be installed so that fiber end 99 engages the internal end of element 87 and causes it to undergo slight axial translation in the forward direction to a point such that the exterior fiber end 100 is positioned slightly forward of a distance from the face 101 of receptacle 82 equal to the nominal length of the prong 83. Accordingly, when the prong 83 is inserted into the wall receptacle, its flat polished distal fiber end will engage the fiber 88 so that good optical transmission of data can be accomplished between the jack prong 83 and the cable 93.

Figure 9:
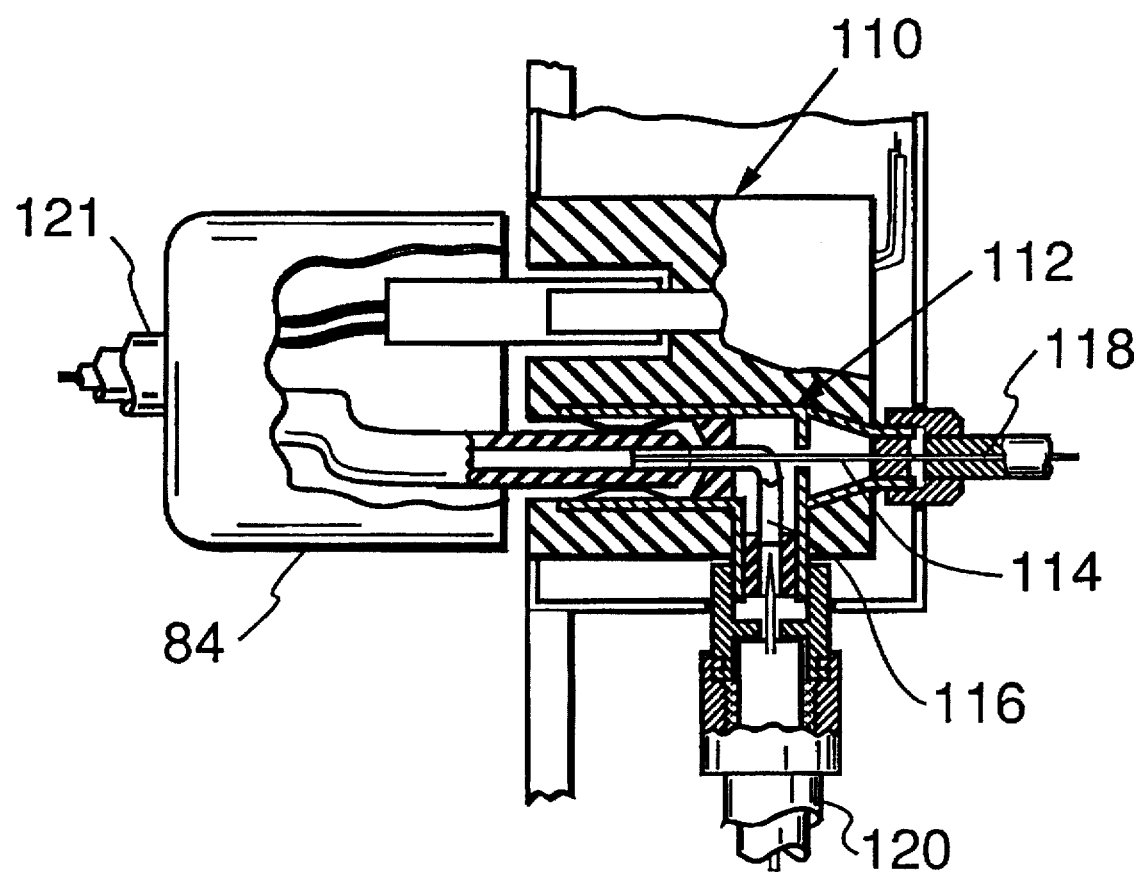
FIG. 9 is a partially broken cross-sectional view illustrating an opto-cable receptacle having means for splitting the optical and electrical signal-carrying paths.

FIG. 9 depicts a similar plug receptacle at 110 except that this unit includes splitter means 112 for splitting the optical fiber 114 from its cladding 116 so that the optical signal path can be coupled to an optical cable 118 and the electrical signal path formed by the cladding 116 can be coupled to a standard coaxial cable 120. A splitter similar to means 112 would also be required at the other end of plug cable 121 to permit separation of the optical and electrical signal paths.

Although the present invention has been described above in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A combination power cord and antenna/signal line coupler for data/signal receiver/transmitter apparatus, comprising:

a power cord having a single conduit including first and second power conductors and a coaxial cable extending therethrough, and a three-prong plug including a pair of power prongs electrically connected to the power conductors, and a coaxial ground prong having a conductive outer sleeve connected to the outer conductor of the coaxial cable, and a coaxial inner conductor connected to the inner conductor of the coaxial cable; and a wall receptacle unit including a pair of openings for receiving said power prongs and a ground prong-receiving bore having signal coupling means formed at the internal extremity thereof, said signal coupling means including an electrically conductive outer sleeve for engaging the outer conductor of said ground prong and an electrically insulative inner sleeve having an axially extending passageway for receiving the internal conductor of said ground prong, the terminating end of said outer sleeve forming a connector to which a signal-carrying cable can be connected to communicate electrical signals passed through the internal conductor.

2. A combination power cord and antenna/signal line coupler as recited in claim 1 wherein said connector is adapted to mate with a standard coaxial cable-coupling means.

3. A combination power cord and antenna/signal line coupler as recited in claim 1 wherein said outer sleeve is adapted to resiliently engage the outer surface of said outer conductor of said ground prong and make electrical contact therewith.

4. A combination power cord and antenna/signal line coupler as recited in claim 1 wherein said plug includes a signal splitter and means forming an outer coaxial port for enabling external connection to said coaxial ground prong.

5. Apparatus for simultaneously connecting data/signal communication lines and power lines to a data/RF, receiver/transmitter device comprising:

plug means including a pair of power prongs and a ground prong, said power prongs being adapted for connection to the power ports of a receiver/transmitter device, said ground prong having first inner and outer coaxial electrical conductors, said outer electrical conductor being adapted for connection to the ground port of the receiver/transmitter device, said inner electrical conductor being adapted for connection to the data/signal port of the receiver/transmitter device; and receptacle means including first and second openings for receiving said pair of power prongs and a third opening for receiving said ground prong, said receptacle means further including first and second electrical contacts associated with said first and second openings and adapted for connection to the first and second conductors of a power line, a third electrical contact associated with said third opening and adapted for connection to a ground conductor of the power line, and a coaxial connector having an internal conductor and an external conductor for connection to a data/signal line, the external conductor of the coaxial connector being connected to said third electrical contact, whereby upon the mating of said plug means with said receptacle means, power is supplied to the receiver/transmitter device and data/RF signals may be communicated between the data/signal line and the receiver/transmitter device via said coaxial connector.

6. Apparatus as recited in claim 5 wherein said first inner coaxial electrical conductor is tubular in configuration, and wherein said plug means further comprises a first optical signal conductor extending through said first tubular inner coaxial electrical conductor and having one end thereof terminating at the distal end of said ground prong.

7. Apparatus as recited in claim 6 wherein said coaxial connector includes an outer electrical conductive coupling means and a tubular inner electrically conductive coupling means, and wherein said receptacle means further comprises a second optical signal conductor passing through said tubular inner conductive coupling and having an end thereof terminating within said third opening such that when said plug means is mated to said receptacle means, the terminating end of said first optical signal conductor is aligned with and in close proximity to the end of said second optical signal conductor so that optical signals may be exchanged therebetween.

8. Apparatus as recited in claim 7 wherein said receptacle means further includes splitter means separating said second optical signal conductor from said tubular inner conductive coupling.

9. Apparatus as recited in claim 8 wherein said splitter means further includes a coaxial connector, for connection to a coaxial electrical cable, and an optical connector for connection to an optical cable.

10. Apparatus as recited in claim 7 wherein said receptacle means includes a coupling element slidably disposed within said third opening, said coupling element including a short length of tubular inner conductor and optical signal conductor, said coupling element serving as a bridging element between the distal end of said ground prong and said coaxial connector.

* * * * *